(12) United States Patent
Eltvedt (10) Patent No.: US 6,648,626 B1
(45) Date of Patent: Nov. 18, 2003

(54) PARTS COLLECTION SYSTEM FOR INJECTION MOLDING MACHINES

(76) Inventor: Frank A. Eltvedt, 3902 Ravenglass Ridge, Crystal Lake, IL (US) 60012

( * ) Notice: Subject to any disclaimer, the term of this patent is extended or adjusted under 35 U.S.C. 154(b) by 0 days.

(21) Appl. No.: 09/556,614

(22) Filed: Apr. 21, 2000

Related U.S. Application Data (60) Provisional application No. 60/130,689, filed on Apr. 23, 1999.

(51) Int. Cl.[7] .............................................. B29C 45/40
(52) U.S. Cl. ......................... 425/436 R; 425/436 RM; 198/523; 209/405; 209/409
(58) Field of Search ...................... 425/88, 556, 436 R, 425/436 RM, DIG. 108; 232/44; 198/523; 414/172, 190; 206/575, 577; 209/404, 405, 409

(56) References Cited

U.S. PATENT DOCUMENTS

| | | | | |
|---|---|---|---|---|
| 2,178,360 A | * | 10/1939 | Kohout | 414/190 |
| 2,759,221 A | * | 8/1956 | Edwards | 425/140 |
| 3,731,568 A | * | 5/1973 | Brock, Jr. et al. | 83/23 |
| 3,907,483 A | * | 9/1975 | York | 425/436 R |
| 3,986,811 A | * | 10/1976 | Gunnels, Jr. | 425/556 |
| 4,118,168 A | * | 10/1978 | Rees et al. | 425/556 |
| 4,741,687 A | * | 5/1988 | Eltvedt | 425/441 |
| 4,787,841 A | * | 11/1988 | Simon | 425/556 |
| 4,915,611 A | * | 4/1990 | Brown | 425/556 |
| 5,269,673 A | * | 12/1993 | Kempf et al. | 425/151 |
| 5,310,327 A | * | 5/1994 | Phillips | 425/151 |
| 5,354,194 A | * | 10/1994 | Kresak | 425/436 R |
| 5,439,634 A | * | 8/1995 | North | 264/334 |
| 5,875,895 A | * | 3/1999 | Dardashti | 206/573 |
| 6,129,883 A | * | 10/2000 | Jacovich et al. | 264/297.3 |
| 6,162,037 A | * | 12/2000 | Verwoerd | 425/126.1 |

* cited by examiner

Primary Examiner—Joseph Drodge
Assistant Examiner—Emmanuel Luk
(74) Attorney, Agent, or Firm—Wallenstein Wagner & Rockey, Ltd.

(57) ABSTRACT

A parts collection system for injection molding machines is disclosed. The system provides for easy and quick changing of devices adapted for receiving molded parts discharged from the molding machine. Generally, the parts collection system of the present invention includes a pair of support tracks for mounting to the frame of the molding machine having a pair of mold member operably connected thereto. Adjustably mounted to the support tracks are a pair of retaining beams for suspending devices adapted to receive parts dropped from the mold members.

25 Claims, 9 Drawing Sheets

PARTS COLLECTION SYSTEM FOR INJECTION MOLDING MACHINES

RELATED APPLICATIONS

This application claims the benefit of U.S. Ser. No. 60/130,689, filed on Apr. 23, 1999, which is incorporated herein by reference.

TECHNICAL FIELD

The present invention generally relates to systems for collecting parts from injection molding machines, and in particular to a system that provides for easy and quick changing of devices for receiving molded parts and/or runners.

BACKGROUND ART

Figure 1:
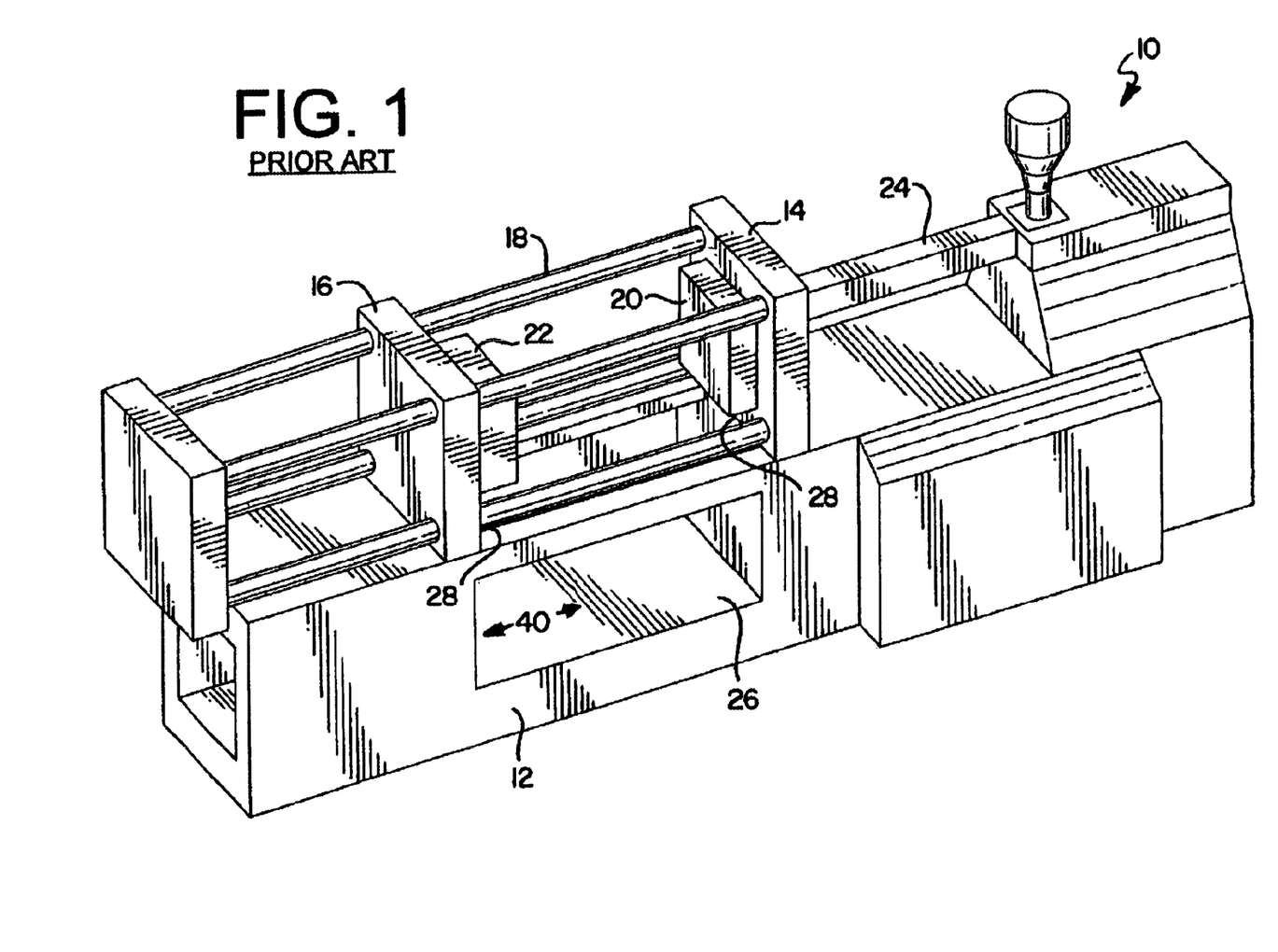
FIG. 1 is a perspective view of a typical molding machine.

A typical machine for injection molding of plastic parts is shown in FIG. 1. The machine 10 includes a suitable frame 12 which carries a fixed platen 14 and a movable platen 16. The movable platen 16 is carried by a plurality of support rods 18 for movement toward and away from the fixed platen 14 by a suitable hydraulic mechanism. Conventional mold members 20 and 22 are mounted in the customary manner to the platens 14 and 16, respectively, for moving towards and away from one another with the platens. The mold members 20 and 22 include complimentary mold cavities (not shown) into which liquid plastic is injected from a conventional ram-type injection mechanism 24.

Generally located below the platens 12,14 and defined within the frame 12 of the molding machine 10 is an open horizontal passage 26 for receiving a freestanding conveyor or the like (not shown). Also, the passage 26 is in communication with an opening 28 positioned generally below the platens 12,14 for allowing molded plastic parts to fall from the mold members 20,22 and into the passage 26 when the mold members 20,22 are separated from each other.

The type of freestanding receiving device positioned underneath the molding machine platens 14,16 and within the passage 26 typically varies as the mold members 20,22 are changed. The swapping of freestanding receiving devices is a time consuming procedure since these devices are separate from the molding machine 10 and thus must be adapted to stand at the desired position and attitude within the passage 26.

SUMMARY OF THE INVENTION

Generally, the parts collection system of the present invention includes a pair of support tracks for mounting to the frame of an injection molding machine having a pair of platens adapted to receive mold members. Adjustably mounted to the support tracks are a pair of retaining beams for suspending a device adapted to receive parts dropped from the mold members.

Other advantages and features of the present invention will be apparent from the following description of specific embodiments illustrated in the accompanying drawings.

DETAILED DESCRIPTION

While this invention is susceptible of embodiments in many different forms, there is shown in the drawings and will herein be described in detail preferred embodiments of the invention. The present disclosure is to be considered as an exemplification of the principles of the invention and is not intended to limit the broad aspects of the invention to the embodiments illustrated.

Figure 2:
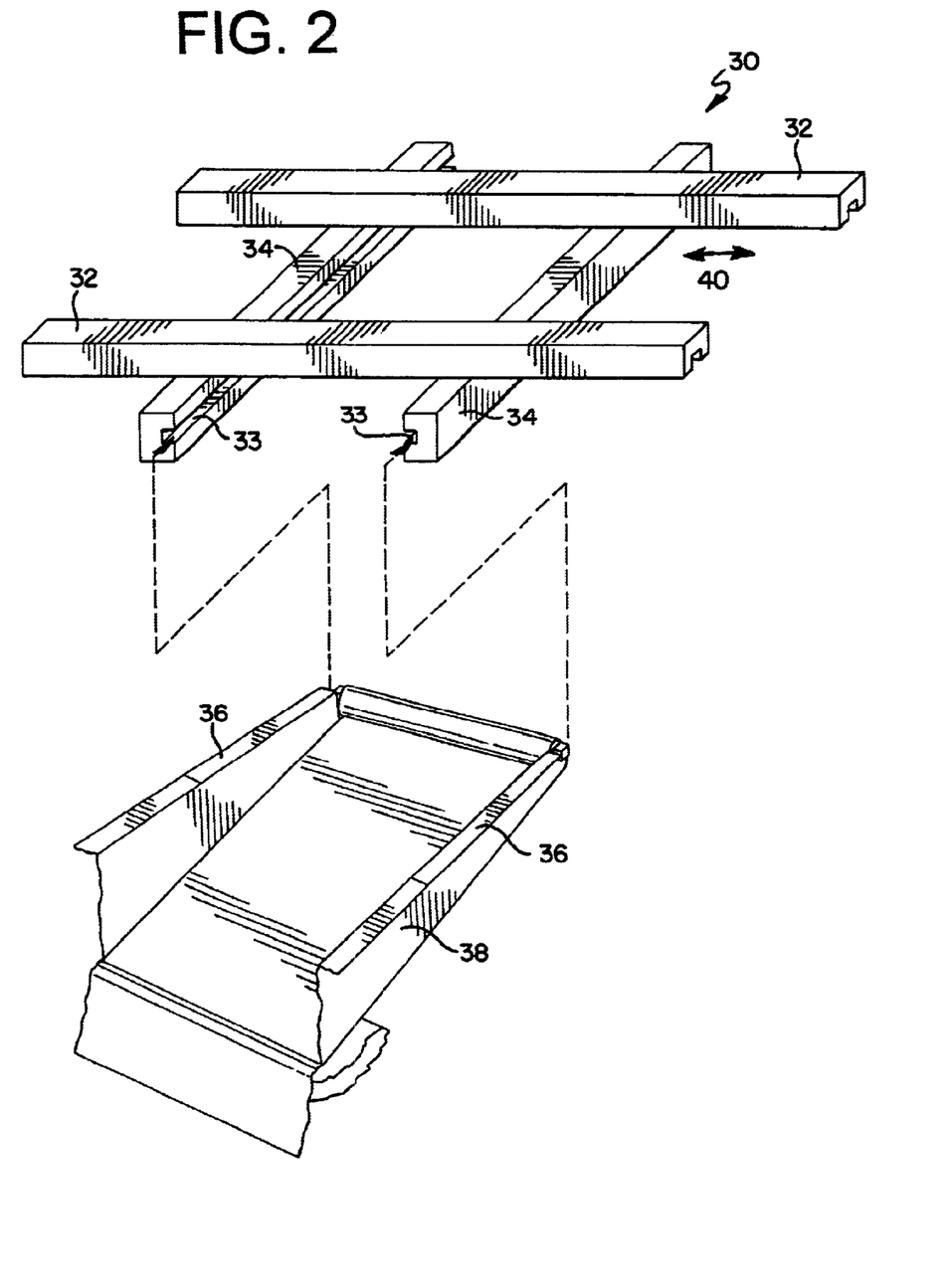
FIG. 2 is an exploded view of a parts collection system in accordance with the present invention for mounting to the molding machine of FIG. 1.

Referring now to the drawings, and particularly to FIG. 2, a parts collection system 30 in accordance with the present invention is depicted for mounting to the frame 12 of the molding machine 10 depicted in FIG. 1. The system 30 includes a pair of slotted support tracks 32 for mounting to the molding machine frame 12. Preferably, the support tracks 32 are in spaced parallel relationship to each other and are mounted about the opening 28 below the platens 14,16 of the molding machine 10.

Adjustably mounted to the support tracks 32 are a pair of slotted 33 retaining beams 34 for receiving respective flanges 36 projecting from a receiving device such as a bin 38, a conveyor or the like. The retaining beams 34 are preferably maintained in spaced parallel relationship with respect to each other, and can be slidingly positioned and locked into place along the lateral axis 40 of the injection molding machine opening 28.

As will be appreciated by those having skill in the art, a plurality of different mounting systems can be provided for mounting support tracks 32 to the injection molding machine. Such mounting systems include, but are not limited to, the use of L-shaped plates fastened to the underside of the press frame, U-shaped plates fastened to the side of the press frame, extrusions of aluminum or steel fastened with brackets to the press frame, adjustably clamp brackets, pivoted clamps and brackets, set screws, side clamps, top clamps, and the like.

Figure 15:
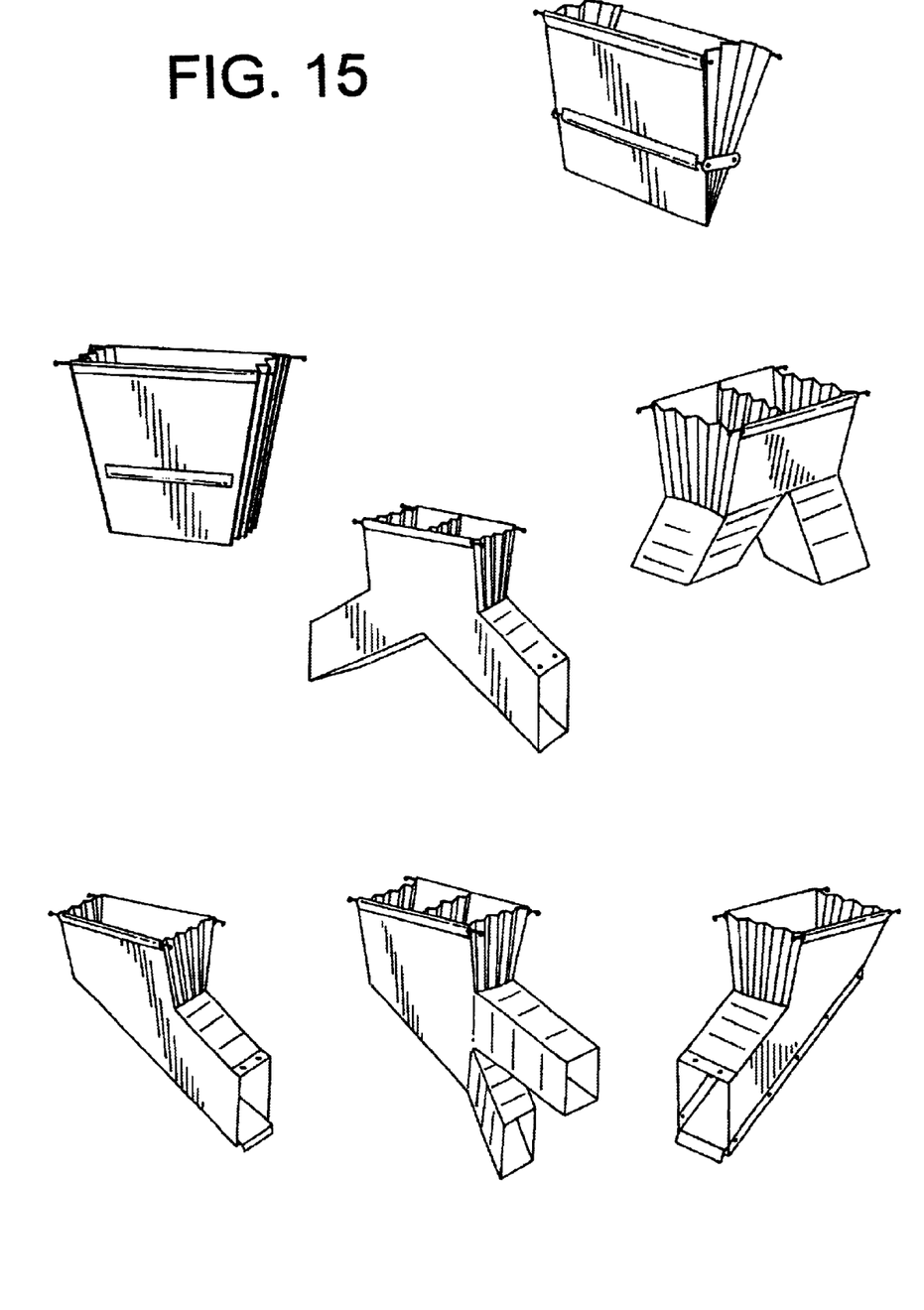
FIG. 15 is a perspective view of a plurality of different receiving devices for use with the parts collection system disclosed herein.

As indicated above, and illustrated in FIG. 15, a plurality of different receiving devices can be provided with outwardly projecting flanges for engaging the slots 36 of the retaining beams 34 operably mounted to the frame 12 and about the opening 28 in the molding machine 10. Accordingly, the inventive parts collection system provides for quickly substituting one type of receiving device for another by slidingly removing the unwanted device and slidingly installing another.

Referring to FIGS. 3–6, another embodiment of a parts collection system in accordance with the present invention is depicted. The system 130 includes a frame 142 for attachment to the molding machine 10 depicted in FIG. 1. The frame 142 preferably consists of a plurality of T-slotted aluminum extensions including a front pair 144 of vertical support tracks 132, a back pair 146 of vertical support tracks 132, two pairs of crossbars 150,152, a pair of upper horizontal support beams 154, and a pair of lower retaining beams 134.

Attached to the marginal ends of the vertical support tracks 132 are joining plates 156 adapted for bolting the support tracks to the frame 12 of the molding machine 10. Preferably, the vertical support tracks 132 are mounted within the passage 26 of the molding machine 10.

Coupled to each pair 144,146 of vertical support tracks 132 is a pair of crossbars comprising an upper crossbar 150 and a lower crossbar 152. The upper crossbars 150 are attached, and perpendicularly extend from, the upper ends of the vertical support tracks 132. The lower crossbars 152 are adjustably mounted to the vertical support tracks 132 by locking members 158 having a lever 160 for manually releasing and fixing each locking member to a user selected location along the length of the vertical support tracks.

The upper horizontal support beams 154 are attached to the upper crossbars 150. The support beams 154 are preferably positioned in spaced parallel relationship to each other and provide for mounting a guide skirt assembly 162 thereto. The guide skirt assembly 162 includes a pair of plastic or like material side panels 164 wherein one longitudinal marginal end of each panel is attached to a brace 166 mounted to one of the support beams 154. Preferably, the brace 166 projects into the opening 28 located below the platens 14,16 of the molding machine 10 depicted in FIG. 1.

The lower retaining beams 134 of the parts collection frame 142 are attached to the lower crossbars 152 and extend within the passage 26 of the molding machine 10 depicted in FIG. 1. Preferably, the retaining beams 134 are in spaced parallel relationship to each other and include an upper longitudinal slot 133. Received within the longitudinal slots 133 of the retaining beams 134 are a plurality of roller wheels 168 extending from a receiving device comprising a bi-directional parts conveyor 138.

The conveyor 138 includes an elongated frame defined by a pair of spaced parallel side rails 172 formed of extruded aluminum. The side rails 172 are similar to each other and include an outer face with a longitudinal slot extending the rail's length for mounting of the roller wheels 168 by conventional means.

The conveyor 138 includes an endless conveyor belt 171 trained over a pair of pulleys (not shown) at each end of the conveyor. Operably connected to one of the pulleys is a drive assembly 173, such as an electric motor, for bi-directional rotation of the conveyor belt 171.

Attached to the side rails 172 of the conveyor 138 are a pair of ridge elongated rectangular guide members 174 defining a pocket holder for receiving an end portion of the guide skirt 162. The guide members 172 have planar inner surfaces that diverge from each other as they extend from the conveyor 138. In an embodiment, the rate at which the guide members 172 diverge from each other is user adjustable.

The conveyor 138 can be quickly and easily removed from the parts collection system frame 142 by rolling the conveyer along the slotted retaining beams 134 and off one end of the beams. Likewise, the conveyor 138 is installed onto the parts collection system frame 142 by engaging the wheels 168 of the conveyor into the slots 133 of the retaining beams 134 and rolling the conveyor to a desired location. Also, the height of the conveyor 138 from the floor surface, and the attitude of the conveyor, can be adjusted by releasing and then fixing the position of the lower crossbars 152 via locking members 158.

Figure 3:
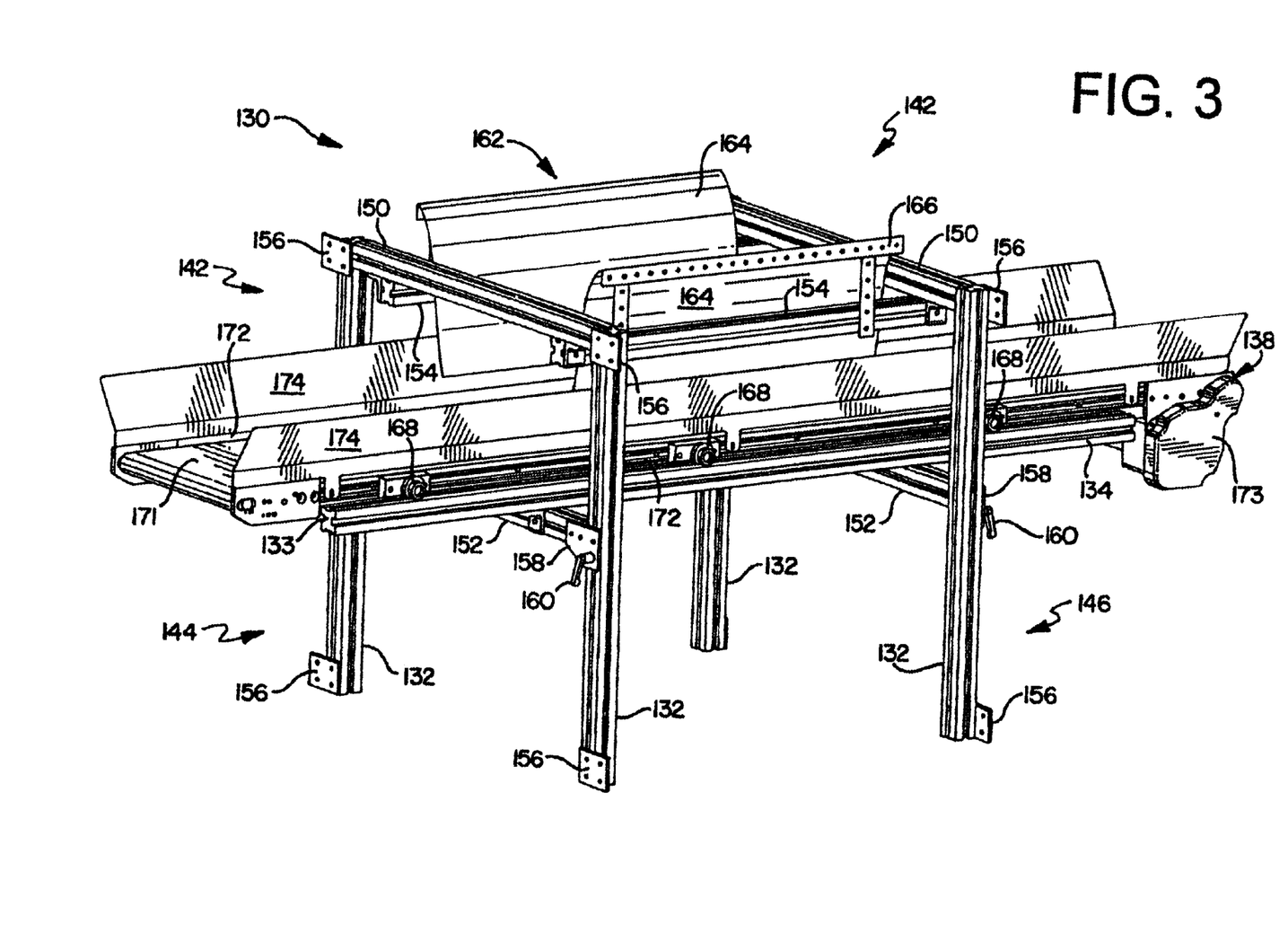
FIG. 3 is a perspective view of another embodiment of a parts collection system in accordance with the present invention having a frame for operably mounting, for example, a conveyor to the molding machine of FIGURE 1.
Figure 4:
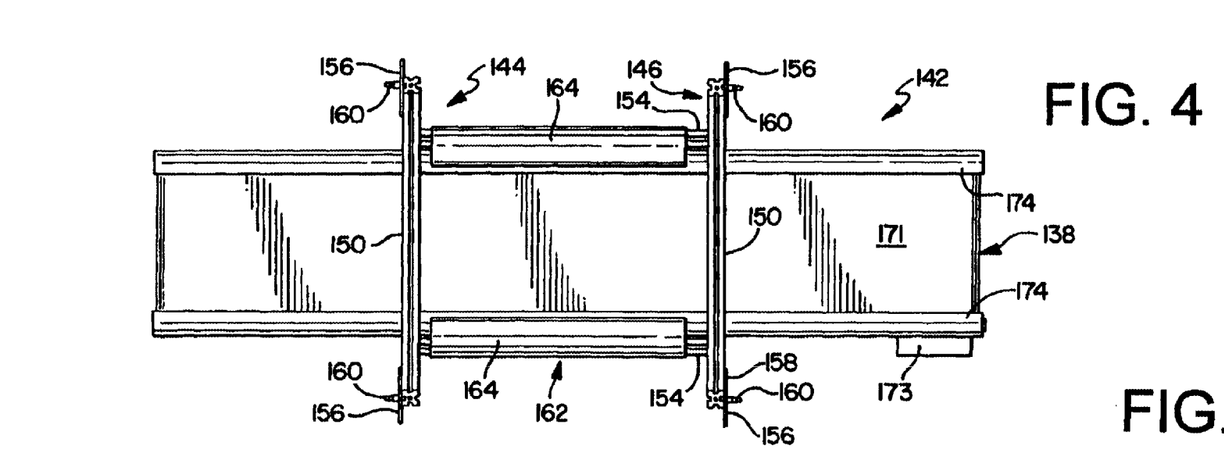
FIG. 4 is a top view of the parts collection system of FIG. 3.
Figure 5:
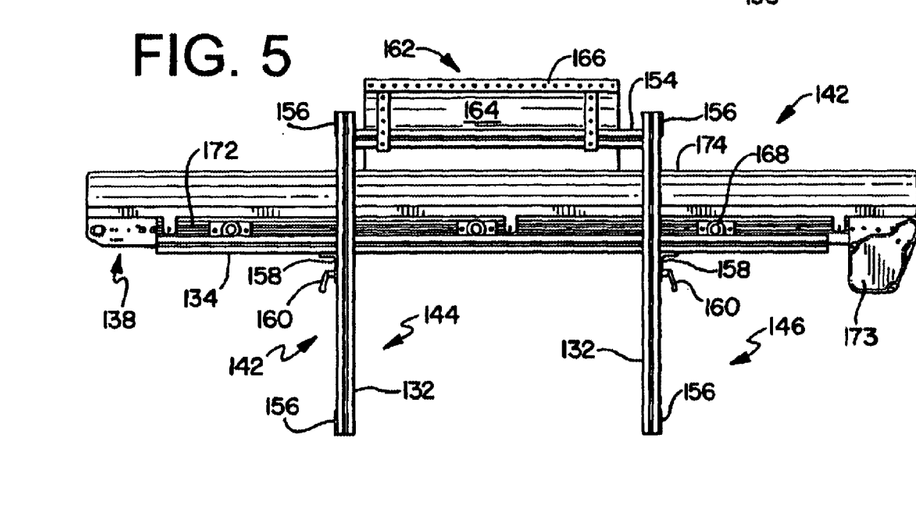
FIG. 5 is a side view of the parts collection system of FIG. 3.
Figure 6:
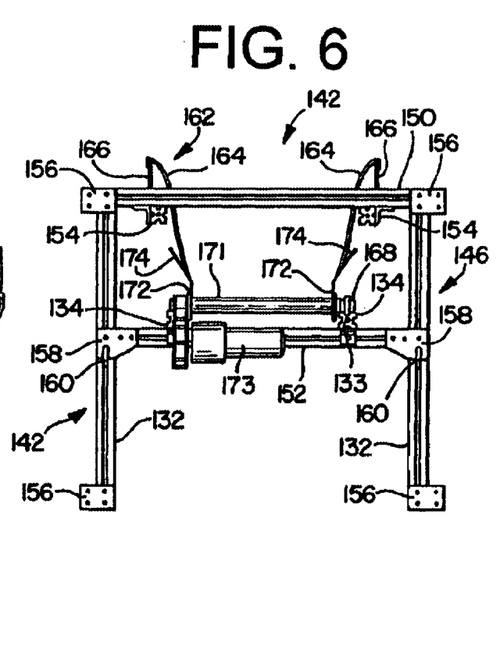
FIG. 6 is a front end view of the parts collection system of FIG. 3.
Figure 7:
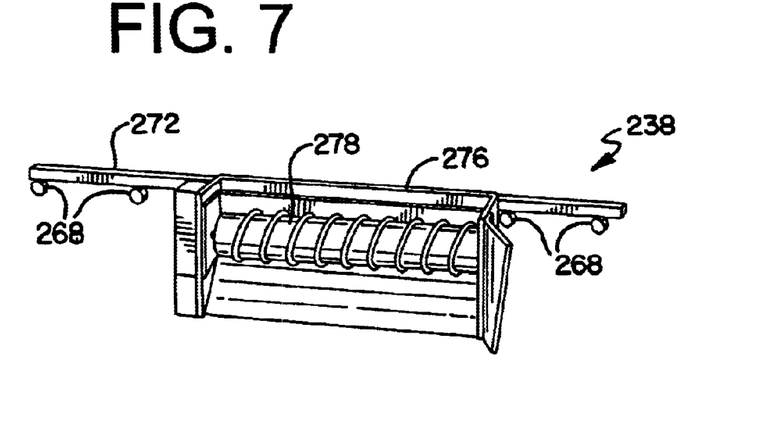
FIG. 7 is a perspective side view of a screw type separator that can be substituted for the conveyor of FIG. 3.

FIG. 7 depicts another receiving device, in particular a screw type separator, for replacing the conveyor of FIG. 3. The separator 238 includes a conventional hopper 276 with a threaded shaft 278 rotatably mounted thereto. A pair of side rails 272 (only one side rail shown) are attached and extend from the hopper 276. Mounted onto the side rails 272 are a plurality of roller wheels 268 adapted to ride on the slotted retaining beams of the parts collection system for ease in installing and removing the separator 238 from the parts collection system frame.

Figure 8:
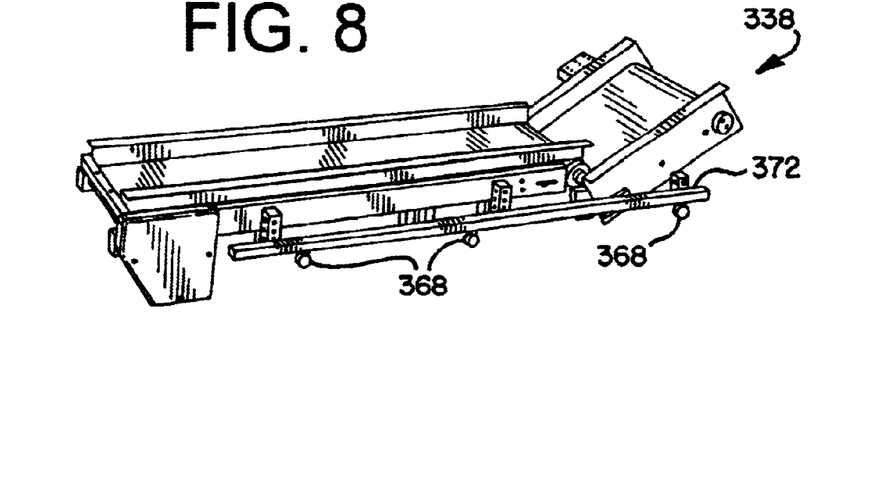
FIG. 8 is a perspective side view of a combination conveyor and separator that can be substituted for the conveyor of FIG. 3.

FIG. 8 illustrates a combination conveyor and belt type separator for replacing the conveyor of FIG. 3. A pair of side rails 372 (only one rail shown) are attached and extend for the combination conveyor and belt type separator 338. Operably connected to the side rails 372 are a plurality of roller wheels 368 to facilitate the installation and removal of the combination conveyor and belt type separator 338 from the parts collection system frame.

Figure 9:
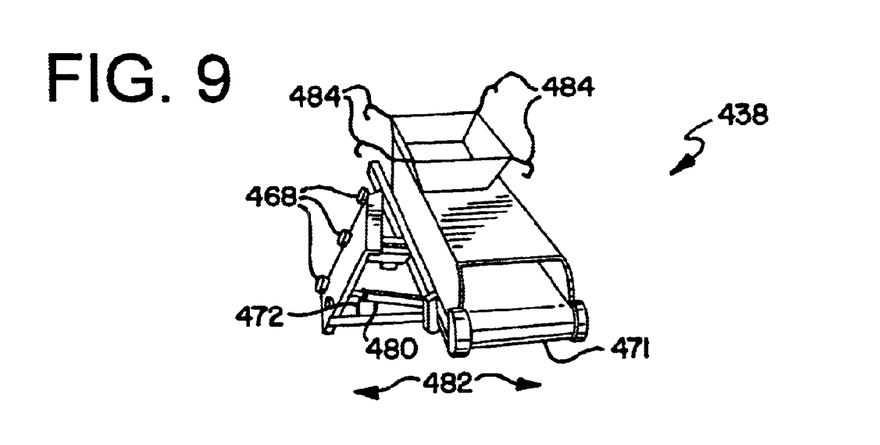
FIG. 9 is a perspective end view of a conveyor having actuators for automated lateral movement of one end of the conveyor.

FIG. 9 shows a conveyor 438 having actuators 480 for automated lateral movement of one end of the conveyor as shown by arrows 482. The actuators 480 can consist of air pistons, hydraulics, or like devices. The actuators 480 and the conveyor 438 are operably mounted to a pair of side rails 472 (only one rails shown) having a plurality of roller wheels 468 for engagement and support of the conveyor 438 by the slotted retaining beams of the parts collection system frame.

The conveyor 438 can also include a guide skirt 162 attached proximate to one end of the conveyor as disclosed in U.S. Pat. No. 4,295,815, filed Oct. 20, 1981, and incorporated herein by reference. The guide skirt 162 can be formed of a limp, flexible fabric having fasteners 484 for hanging from the molds of the molding machine wherein the guide skirt prevents the molded parts from bouncing away as they fall to the belt 471 of the conveyor.

In an embodiment, one or more actuators can also be attached to the conveyor 438 and the frame of the parts collection system for longitudinally moving the conveyor along the retaining beams to predetermined positions at preselected times. This embodiment can be used, for example, to move the ends of the conveyor 438 at preselected times for depositing molded parts into different receptacles. Moreover, actuators can be provided for moving the conveyor vertically up and/or down.

Other receiving device that can be mounted to the parts collection system frame include, but are not limited to, vertical transfer platforms, front and rear sorters, front discharge deflections chutes, chutes to blow parts, chutes to vacuum parts, two stage screw type separators, and sorters such as disclosed in U.S. Pat. No. 4,387,064, filed Jun. 7, 1983, and incorporated herein by reference.

In an embodiment, the parts collection system is distributed as a kit that can be assembled and installed onto a molding machine by a user. The kit preferably includes at least one shipping box containing all collection system frame members, all parts for attaching the frame members together, and instructions for assembling and installing the frame onto a molding machine. The kit preferably is contained within a box suitable for shipping and delivery to a location where the molding machine is used.

Turning to FIGS. 10–14, another embodiment of a parts collection system 530 in accordance with the present invention is depicted having two vibrating conveyors 586,587 mounted in parallel spaced relationship to each other. This embodiment can be used, for example, to separate molded parts from larger plastic runners produced and discharged from mold cavities as a result of the molding process.

Figure 10:
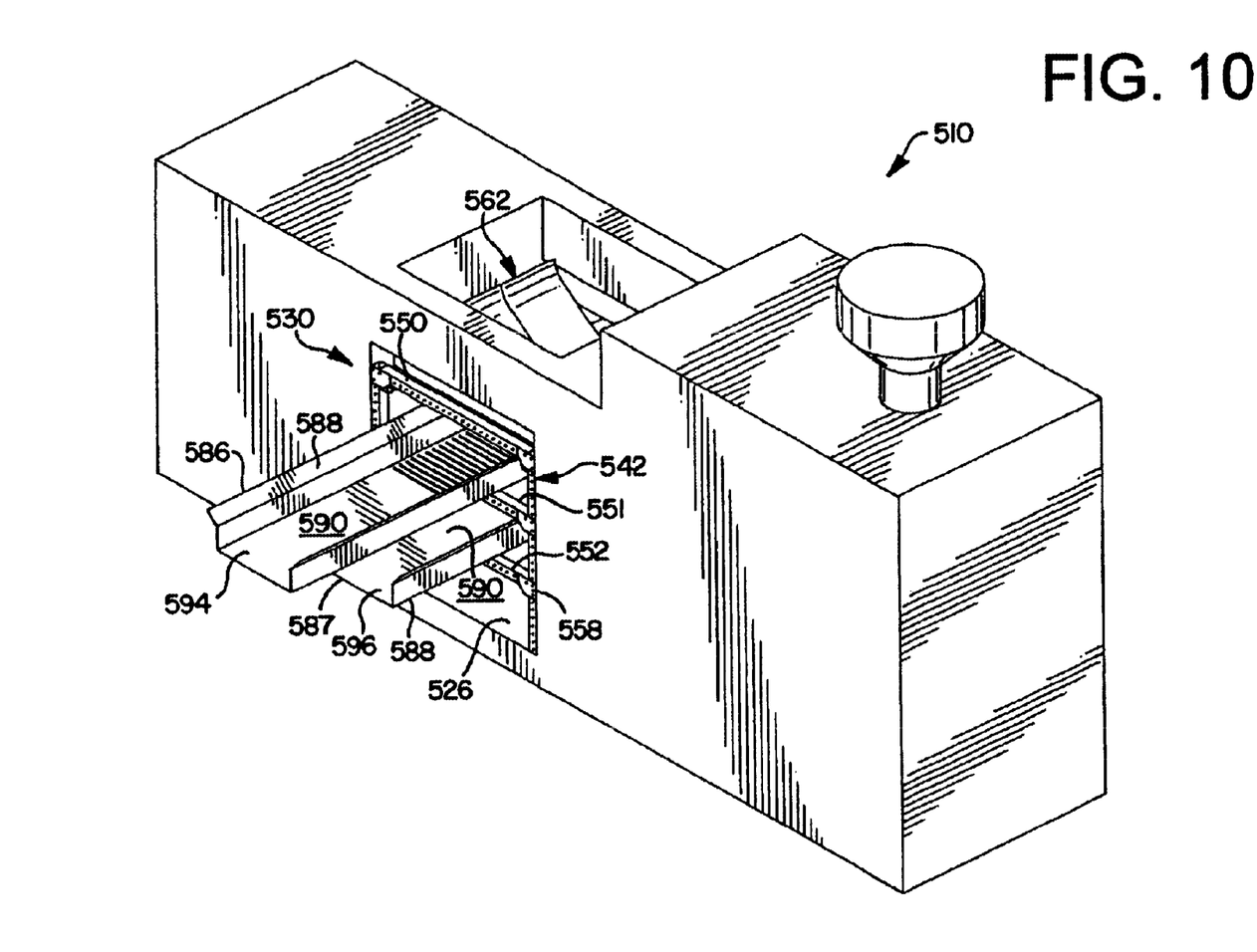
FIG. 10 is a perspective view of another parts collection system in accordance with the present invention mounted to a conventional molding machine.
Figure 11:
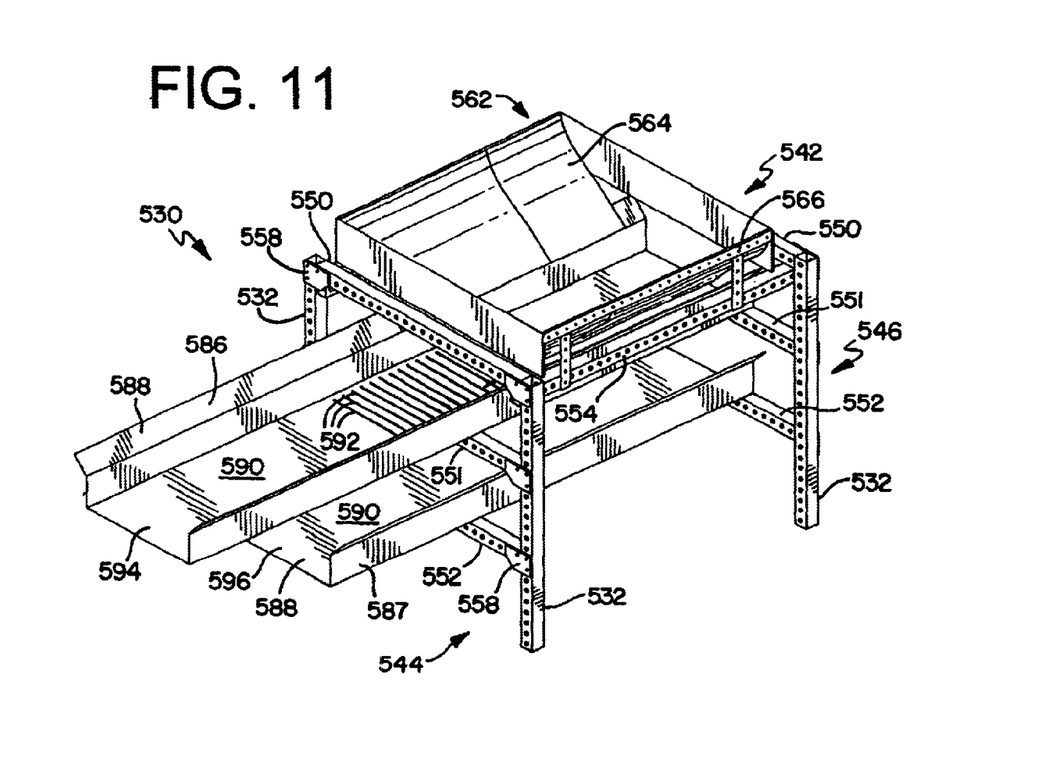
FIG. 11 is a perspective view of the parts collection system of FIG. 10 removed from the molding machine.
Figure 12:
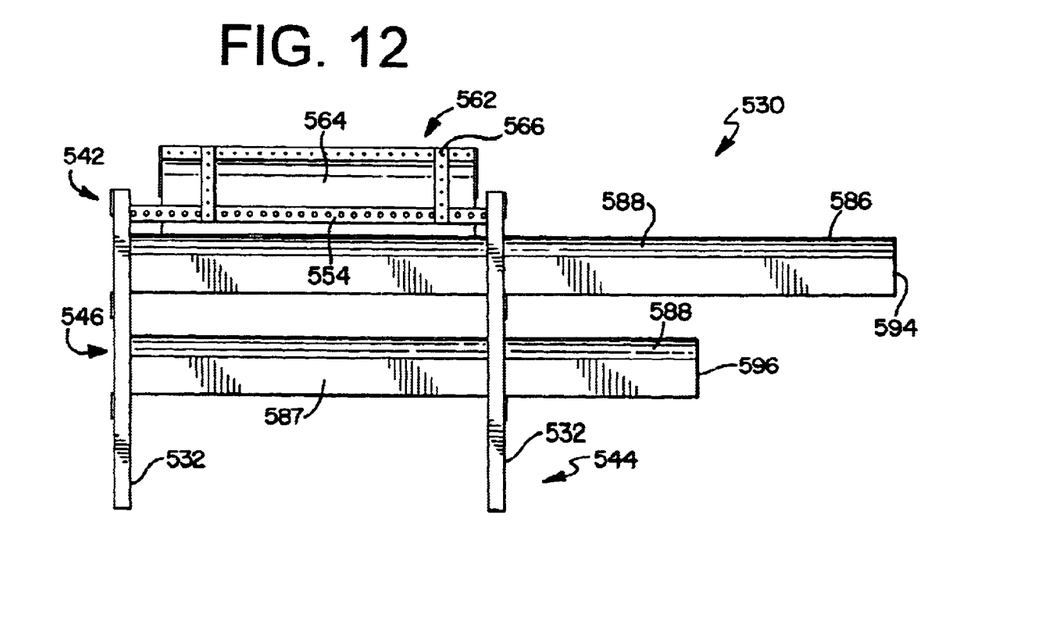
FIG. 12 is a side view of the parts collection system of FIG. 11.
Figure 13:
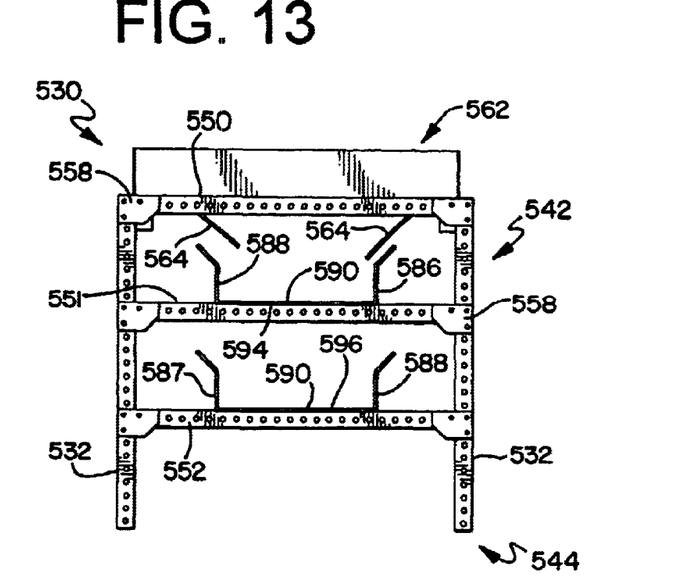
FIG. 13 is an end view of the parts collection system of FIG. 11.
Figure 14:
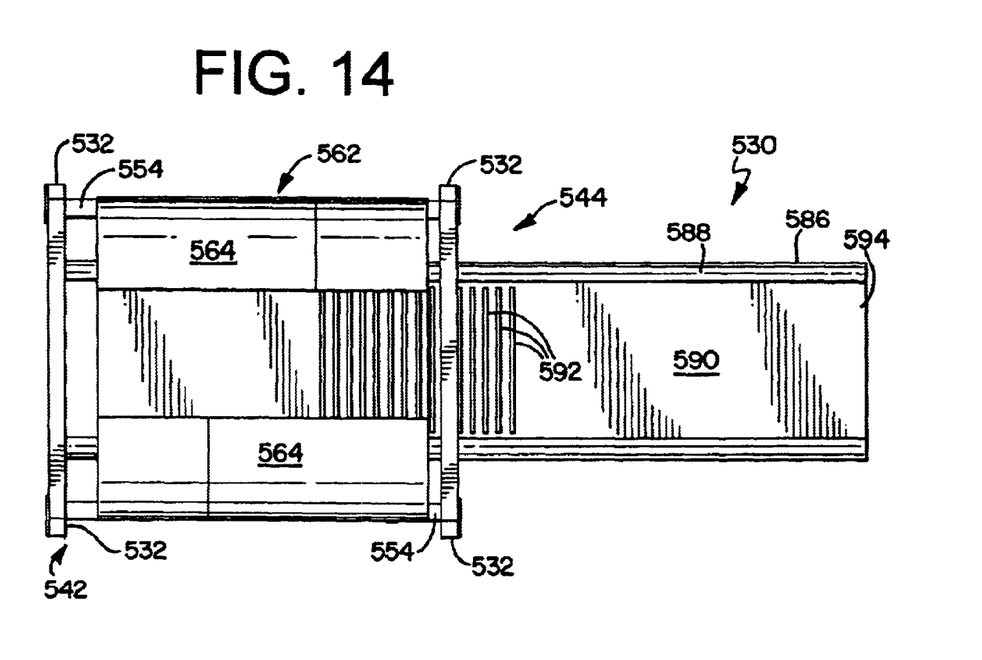
FIG. 14 is a top view of the parts collection system of FIG. 11.

The system 530 includes a frame 542 for attachment to the conventional molding machine 510 depicted in FIG. 10. Preferably, the frame 542 is contained within the passage 526 extending into the molding machine 510. The frame 542 consists of a plurality of metal tubes that are square in cross section and have a plurality of equally spaced open apertures on two opposite side surfaces. The metal tubes include a front pair 544 of vertical support tracks 532, a back pair 546 of vertical support tracks 532, two sets of crossbars 550, 551,552, and a pair of upper horizontal support beams 554.

Mounted to each pair 544,546 of vertical support tracks is a set of crossbars comprising an upper crossbar 550, an intermediate crossbar 551, and a lower crossbar 552. The upper crossbars 550 are coupled, and perpendicularly extend from, the upper ends of the vertical support tracks 532. Also, the intermediate crossbars 551 and the lower crossbars 552 are mounted, via bolted joining plates 558, to the vertical support tracks 532 below the upper crossbars 550.

The upper horizontal support beams 554 are attached to the upper crossbars 550 between the front pair 544 and the back pair 546 of vertical support tracks 532. The upper support beams 554 provide for mounting a guide skirt assembly 562 thereto. The guide skirt assembly 562 includes a pair of plastic or metal side panels 564 with one longitudinal marginal end of each panel attached to a brace 566 extending from a support beam 554.

Mounted to the intermediate crossbars 551 and the lower crossbars 552 are vibrating conveyors 586 and 587, respectively. The vibrating conveyors 586,587 are conventional in construction and each conveyor includes an elongated trough 588 having a planar bottom 590 and a drive mechanism (not shown) for reciprocal vibratory motion of the trough along its longitudinal axis.

The conveyors 586,587 are preferably mounted in spaced parallel relationship to each other with the upper conveyor 586 positioned directly over the lower conveyor 587. The upper conveyor 586 has a plurality of parallel spaced transverse openings 592 in the bottom 590 of its trough 588. The openings 592 are dimensioned for allowing molded parts to drop through the openings and into the trough of the lower conveyor 587.

Preferably, the trough length of the upper conveyor 586 is longer than the trough length of the lower conveyor 587. Accordingly, a marginal discharge end 594 of the upper conveyor 586 overhangs a like discharge end 596 of the lower conveyor 587.

In operation, molded parts and larger runners drop from mold members of the molding machine 510 and are received in the trough 588 of the upper conveyor 586. The parts and runners are moved by the conveyor 586 across openings 592 wherein the parts, but not the runners, drop through the openings and into the lower conveyor 587. The runners are then discharged from the end 594 of the upper conveyor 586 where the runners drop into a receptacle or the like (not shown) for receiving only runners. Likewise, molded parts received by the lower conveyor 587 are moved by the conveyor and are discharged from end 596 where the parts drop into a receptacle or the like (not shown) for only receiving molded parts.

As will be appreciated by those having skill in the art, a plurality of other devices can also be attached to the parts collection system for receiving parts. For example, a short stroke (Vertical Transfer Platform) can be mounted directly under the mold and contain a load cell to checkweigh the shot before leaving the molding tress.

While the specific embodiments have been illustrated and described, numerous modifications come to mind without significantly departing from the spirit of the invention and the scope of protection is only limited by the scope of the accompanying claims.

What is claimed is:

1. A collection system for facilitating the collection of items dropped from molds mounted to an injection molding machine comprising:
    a device adapted for receiving items dropped from the molds of the injection molding machine;
    a frame having a pair of support tracks and a pair of retaining beams;
    the pair of support tracks operably mounted to the injection molding machine;
    the pair of retaining beams for suspending the device generally beneath the molds of the injection molding machine, and
    the device being slidingly mounted to and supported by the frame.

2. The system of claim 1 wherein the device for receiving items dropped from the injection molding machine is a conveyor.

3. The system of claim 1 wherein the device for receiving items dropped from the injection molding machine is a drop tray.

4. The system of claim 1 wherein the device for receiving items dropped from the injection molding machine is a chute.

5. The system of claim 4 wherein chute provides for directing parts.

6. The system of claim 4 wherein chute provides for blowing parts.

7. The system of claim 4 wherein chute provides for vacuuming parts.

8. The system of claim 1 wherein the device for receiving the items dropped from the injection molding machine is a combination conveyor and separator.

9. The system of claim 1 wherein the device for receiving the items dropped from the injection molding machine is a separator.

10. The system of claim 1 further including a guide skirt operably connected to the frame.

11. The system of claim 1 wherein the device for receiving the items is a screw type part and runner separator.

12. The system of claim 1 wherein the device for receiving the items is a vertical transfer platform.

13. The system of claim 1 further including instructions for installation of the collection system onto the injection molding machine.

14. The system of claim 13 wherein the collection system is contained within a box suitable for shipping to a location where the molding machine is installed.

15. The system of claim 1 wherein the items include molded parts and runners.

16. The system of claim 1 wherein actuators are attached to the frame for longitudinally and vertically moving the device for receiving parts.

17. A parts collection system for facilitating the collection of parts dropped from molds mounted to an injection molding machine and into a receiving device adapted to receive the parts comprising:

a frame having a pair of support tracks and a pair of retaining beams, the pair of support tracks adapted for mounting to the injection molding machine, and the pair of retaining beams adapted for operably mounting to the support tracks and suspending the receiving device generally beneath the molds of the injection molding machine, the device being slidingly mounted to and supported by the frame;

instructions detailing how to install the frame onto the injection molding machine; and wherein the frame is contained within at least one box suitable for shipping to a location wherein the molding machine is installed.

18. The system of claim 17 wherein the device for receiving parts dropped from the injection molding machine is a conveyor.

19. The system of claim 18 wherein the device for receiving parts dropped from the injection molding machine is a drop tray.

20. The system of claim 17 wherein the device for receiving the parts dropped from the injection molding machine is a combination conveyor and separator.

21. The system of claim 17 wherein the device for receiving the parts dropped from the injection molding machine is a separator.

22. The system of claim 17 further including a guide skirt for connecting to the frame.

23. The system of claim 17 wherein the device for receiving the parts is a screw type part and runner separator.

24. The system of claim 17 wherein the device for receiving the parts is a vertical transfer platform.

25. The system of claim 17 wherein actuators are attached to the frame for longitudinally and vertically moving the device for receiving parts.

* * * * *